June 3, 1930.  P. T. DOLLEY  1,761,433
PRODUCTION OF HYDROCYANIC ACID
Filed Oct. 19, 1927
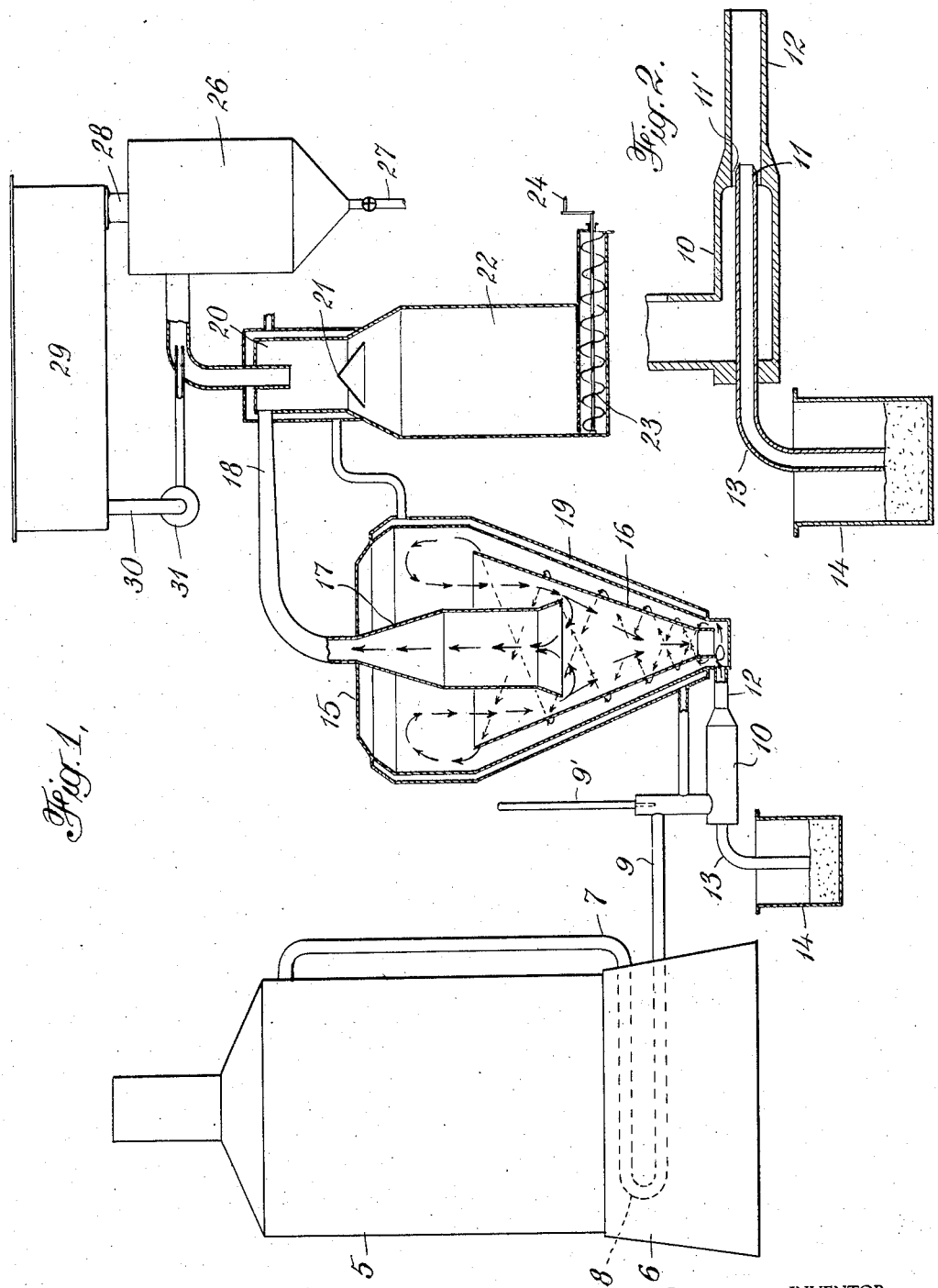

Patented June 3, 1930

1,761,433

UNITED STATES PATENT OFFICE

PAUL T. DOLLEY, OF LOS ANGELES COUNTY, CALIFORNIA, ASSIGNOR TO CALIFORNIA CYANIDE COMPANY, INCORPORATED, OF NEW YORK, N. Y., A CORPORATION OF DELAWARE

PRODUCTION OF HYDROCYANIC ACID

Application filed October 19, 1927. Serial No. 227,164.

This invention relates to the production of hydrocyanic acid, and particularly to a method and apparatus for the recovery of hydrocyanic acid gas by the reaction of steam, or a mixture of steam and other suitable gases, with cyanogen compounds of the alkali or alkaline earth metals.

The primary object of the invention is to produce gaseous hydrocyanic acid in high concentration from the solid commercial cyanide compounds. Another object is to supply the reacting substances and to remove the products of the reaction in such a manner that the process may be carried out continuously. Other objects will be apparent from the following detailed description.

I have discovered that when alkali or alkaline earth metal cyanogen compounds are treated with steam or with steam and other reagents, such as carbon dioxide and sulphur dioxide, hydrocyanic acid is liberated. By feeding the cyanide into the reaction zone in finely divided form, and maintaining it in suspension and in motion with dry steam at the proper temperature and pressure during a suitable time interval, the method may be carried on continuously with a high percentage yield of hydrocyanic acid. The proper operating conditions and the percentage yield vary with the kind of cyanide used and its purity.

Contact between the cyanogen compounds and the gaseous reagent may be effected in various ways and in different types of apparatus. Conveniently the dry steam can be supplied under pressure to an injector adapted to produce an aspirating effect sufficient to draw the finely divided solid particles of cyanide from a receptacle and to mingle the same with the steam. In a preferred form of apparatus for carrying out the process the mixture enters the bottom of the reaction chamber which is preferably conical in form and is introduced tangentially therein to induce a "cyclone" effect or whirling motion. The steam with the suspended particles passes between the wall of the chamber and a cone disposed therein and spaced from the wall to form a passage and is directed toward the top of the chamber whence it is directed downwardly on the inner side of the cone. A second baffle, preferably conical in form, depends from the top of the chamber and is connected to the outlet. This baffle, together with the first-mentioned cone, defines a narrow annular passage. The gas stream is directed downward through the passage and its velocity is increased due to the constricted area. The larger and heavier particles continue downward to the bottom of the reaction chamber where they are picked up by the incoming gas stream and recirculated. The pressure in the reaction chamber is normally slightly above atmospheric. If the static pressure is raised, other conditions remaining the same, a smaller proportion of solid material will be recirculated, while if the static pressure is lowered, a larger proportion is recirculated. The gas makes its way outward at a reduced velocity, carrying with it in suspension the light particles resulting from the reaction. The arrangement of the baffles and the pressure control are such that the time required for the passage of the gaseous stream through the chamber is sufficient to permit the completion of the preferred reaction between the solid particles and the gaseous reagent with which the particles are thoroughly mingled during their passage through the chamber. The reaction is completed and the solid particles are withdrawn with the gaseous stream so that no solid material remains in the reaction chamber except possibly some particles which have not been reduced to a sufficiently fine condition; such particles will collect in the bottom of the chamber and can be removed therefrom from time to time as may be required.

If gases such as carbon dioxide or sulphur dioxide are employed in addition to superheated steam, these gases may be added at any convenient point so as to mingle with the steam and the solid particles suspended therein. The gases can, for example, be mingled with steam before the latter enters the injector.

The gases from the reaction chamber carrying in suspension the solid particles are passed through a cyclone separator to remove the solid material. The separator is preferably steam-jacketed and maintained at substantially the same temperature as the reaction chamber.

In conducting the reaction between steam and cyanides, the steam should be dry, preferably superheated, and condensation of water therefrom should be avoided. When the process is carried out at substantially atmospheric pressure, the minimum temperature at which dryness can be maintained is a little above 100° C. In addition to preventing condensation the temperature has an effect upon the chemical reactions and may be varied to obtain the maximum yield; also the time of contact must be controlled in order to prevent subsidiary reactions and loss of hydrocyanic acid through the polymerization thereof or the formation of ammonia. The pressure within the apparatus and the resulting velocity of the materials through any given apparatus determine the time of contact. The pressure and therefore the time of contact can be controlled at will.

The preferred form of apparatus is illustrated diagrammatically in the drawings, in which Fig. 1 is a sectional view of the apparatus; and Fig. 2 is an enlarged sectional view of the injector.

Referring to the drawing, 5 indicates a conventional boiler which may be of any desired type designed to produce steam at the temperature and under the pressure required for the operation of the process. The boiler is provided with a fire box 6 in which the heat required for the boiler is generated by any usual or suitable combustion operation. The steam may be withdrawn through a pipe 7 and conveyed to a coil 8 in the fire-box for the purpose of introducing the required degree of superheat to the steam. The superheated steam is conveyed through a pipe 9 to an injector 10 comprising a casing with pipe 11 therein extending through the casing and forming an annular orifice 11' through which the steam passes into a pipe 12. The pipe 11 is provided with a flexible extension 13 which may be disposed in a receptacle 14 for the solid material to be introduced into the apparatus. The flexible extension permits the continued withdrawal of the solid material from the receptacle under the influence of suction produced by the steam flowing through the injector. When other gases such as carbon dioxide or sulphur dioxide are mingled with the steam these gases can be introduced conveniently in the required proportions through a pipe 9' from any suitable source. The gas will pass with this steam through the injector and will be mixed thoroughly with the solid particles in suspension.

The pipe 12 enters the bottom of a reaction chamber 15 and is arranged to direct the gaseous stream tangentially therein. A conical baffle 16 is disposed within the chamber and is spaced from the wall and the bottom thereof to form a passage for the whirling stream of gas carrying the solid particles. The baffle 16 extends upwardly to a point near the top of the chamber and a baffle 17 depends from the top thereof and directs the stream of gas downwardly toward the bottom of the chamber. A portion of the stream will pass downwardly around the lower edge of the baffle 16 as indicated in Fig. 2 and will join the entering stream of gas carrying the suspended particles. The balance of the gaseous stream also carrying suspended particles will pass through an outlet 18. The chamber is surrounded preferably with a jacket 19 through which a heating medium such as steam or any desired cooling medium such as water may be circulated for the purpose of controlling the temperature of the chamber.

The gaseous stream carrying the solid particles therein travels through the pipe 18 to a separator 20 which comprises a chamber into which the gaseous stream is introduced tangentially. A baffle 21 is disposed at the bottom of this chamber and is spaced from the lower edge thereof forming an annular passage through which the solid particles may drop into a receptacle 22. From the receptacle the solid material may be withdrawn in any suitable manner as, for example, by a worm 23 operated by a handle 24 or by any suitable mechanical device. The gas passes through a centrally disposed pipe 25 into a chamber 26 designed to permit the cooling of the gas for the purpose of separating water therefrom. The water can be withdrawn through an outlet 27 and the gas, free from solid particles and from water, escapes through a pipe 28. It may be delivered thereby to a fumigating chamber 29 from which gas may be circulated through a pipe 30 and pump 31 if desired to the dryer 26. The dimensions of the apparatus may be varied to obtain vapor conditions for the treatment of different materials and to alter the capacity.

As an example of the method, calcium cyanide produced by subjecting calcium carbide to the reaction of hydrocyanic acid was introduced through the injector with steam under a pressure of ninety pounds per square inch and at a temperature of 245° C. Four pounds of this material were introduced during a period of five minutes and permitted to react in the reaction chamber which was heated by steam to the jacket. The gaseous stream passed through the separator and escaped therefrom practically free from dust. It then passed through the cooler which separated substantially all of the surplus steam as water.

The cyanide material contained 2.22 pounds of cyanogen. After the hydrocyanic acid had been generated and expelled from the apparatus .25 pounds of coarse residue containing .0013 pounds of cyanogen remained in the bottom of the generator and generating chamber. The receptacle attached to the separator contained 2.50 pounds of dry residue containing .0439 pounds of cyanogen. Thus, the total cyanogen remaining in the solid residue was found to be .0452 pounds which was 2.04% of the total cyanogen contained in the original calcium cyanide. The condenser contained 1.25 pounds of liquid condensate, mostly water, but containing .0179 pounds of cyanogen. The cyanogen remaining in the condensate was thus 0.81% of the cyanogen contained in the original calcium cyanide. The gas stream issuing from the apparatus contained 2.175 pounds of hydrocyanic acid gas or 2.094 pounds of cyanogen which was 94.4% of the cyanogen contained in the calcium cyanide used.

In a similar operation one pound 11 ounces of a cyanogen compound produced by melting calcium cyanamid and sodium chloride and containing 6.28 ounces of cyanogen was treated. The hydrocyanic acid evolved and recovered in this operation contained 65% of the total cyanide content of the cyanogen compound.

In the treatment of other cyanogen compounds, such as both crude and pure sodium cyanide, it was found that the introduction of carbon dioxide with the steam greatly increased the yield of hydrocyanic acid, due possibly to the combination of the carbon dioxide with the strongly reactive oxides or hydroxides formed, thereby preventing recombination with the hydrocyanic acid liberated, where, as in the case of the weaker alkaline earth metals, such addition is not necessary. Other similar gaseous or finely divided solid substances having a similar effect in promoting the reaction or increasing the yield fall within the scope of this invention.

The method as applied to a crude material containing 30% sodium cyanide with carbon dioxide and steam showed a high yield. In an operation in which one pound of carbon dioxide and one quarter pound of steam were used per minute with one pound of the crude material, only one to two per cent. of the cyanide remained in the residue, the balance having been liberated as gaseous hydrocyanic acid. The reaction proceeds similarly when substantially pure sodium cyanide is treated under the same conditions with steam and carbon dioxide.

The method can be utilized also to separate hydrocyanic acid from a magnesium cyanide, such as the product disclosed in the patent to Olberg, No. 1,609,038.

Instead of reducing the cyanogen compounds to a sufficiently fine state of subdivision, it may be desirable to recycle the residue obtained from the separator as a result of the first treatment. It is also possible that with some materials a satisfactory yield cannot be obtained by a single passage of the material through the reaction chamber. In this case the residue may also be recirculated.

Although the invention has been illustrated by examples illustrating its application to several well known cyanide compounds, it may be utilized in treating other cyanogen compounds and various changes may be made in the operation and in the apparatus employed without departing from the invention or sacrificing any of its advantages.

I claim:—

1. The method of producing hydrocyanic acid, which comprises treating a dry pulverulent cyanide of the alkali and alkaline earth metal groups with steam.

2. The method of producing hydrocyanic acid, which comprises treating a cyanide of the alkali and alkaline earth metal groups as a finely divided solid in gaseous suspension with steam.

3. The method of producing hydrocyanic acid, which comprises treating dry pulverulent calcium cyanide with steam.

4. The method of producing hydrocyanic acid, which comprises treating calcium cyanide as a finely divided solid in gaseous suspension with steam.

In testimony whereof I affix my signature.

PAUL T. DOLLEY.